US 6,690,677 B1

(12) United States Patent
Binder

(10) Patent No.: US 6,690,677 B1
(45) Date of Patent: Feb. 10, 2004

(54) NETWORK FOR TELEPHONY AND DATA COMMUNICATION

(75) Inventor: Yehuda Binder, Hod Hasharon (IL)

(73) Assignee: Serconet Ltd., Netanya South (IL)

( * ) Notice: Subject to any disclaimer, the term of this patent is extended or adjusted under 35 U.S.C. 154(b) by 0 days.

(21) Appl. No.: 09/357,379

(22) Filed: Jul. 20, 1999

(51) Int. Cl.[7] .................................................. H04J 3/16
(52) U.S. Cl. ...................... 370/465; 370/487; 370/463; 379/90.01
(58) Field of Search ................................. 370/465, 463, 370/493, 494, 495, 487, 476, 488, 497, 498, 466, 467, 480; 379/90.01, 93.01, 93.05, 93.09

(56) References Cited

U.S. PATENT DOCUMENTS

| | | | |
|---|---|---|---|
| 4,766,402 A | 8/1988 | Crane | 333/25 |
| 4,785,448 A * | 11/1988 | Reichert et al. | 370/450 |
| 4,885,747 A | 12/1989 | Foglia | 370/490 |
| 5,255,267 A | 10/1993 | Hansen et al. | 370/401 |
| 5,757,803 A * | 5/1998 | Russell et al. | 370/494 |
| 5,841,360 A | 11/1998 | Binder | 340/825.52 |
| 5,878,047 A | 3/1999 | Ganek et al. | 376/486 |
| 5,896,443 A | 4/1999 | Dichter | 379/93.08 |
| 5,930,340 A | 7/1999 | Bell | 379/93.08 |
| 6,069,899 A * | 5/2000 | Foley | 370/463 |
| 6,137,865 A * | 10/2000 | Ripy et al. | 379/90.01 |
| 6,192,399 B1 * | 2/2001 | Goodman | 370/447 |
| 6,212,227 B1 * | 4/2001 | Ko et al. | 375/222 |
| 6,240,166 B1 * | 5/2001 | Collin et al. | 370/445 |
| 6,285,754 B1 * | 9/2001 | Sun et al. | 370/493 |
| 6,356,562 B1 * | 3/2002 | Bamba | 370/217 |

FOREIGN PATENT DOCUMENTS

| | | |
|---|---|---|
| WO | 99 03255 | 1/1999 |
| WO | 99 12330 | 3/1999 |

OTHER PUBLICATIONS

CHOW et al., "Multi–drop In–house ADSL Distribution Network", *International Conference on Communication*, (1994)pp.456–460.

\* cited by examiner

*Primary Examiner*—Douglas Olms
*Assistant Examiner*—Brian Nguyen
(74) *Attorney, Agent, or Firm*—Browdy and Neimark, P.L.L.C.

(57) ABSTRACT

A local area network using the telephone wiring within a residence or other building simultaneously with telephony signals. The local area network uses high pass filters to access the high-frequency band across the media, whereas the standard telephone service uses low pass filters to access the low-frequency voice/analog telephony band across the same media. The electrically-conducting media connecting telephone/data outlets are split, or separated at each outlet, and the outlets are modified to provide access to both ends of the resulting segments. The low pass filters at each segment end join the segments together, allowing analog telephony signals to travel throughout the network, thus supporting normal telephone service. The high pass filters at each segment end are connected to modems or other Data Communication Equipment, thus supporting data communication networks of various topologies, including point-to-point topologies.

28 Claims, 11 Drawing Sheets

NETWORK FOR TELEPHONY AND DATA COMMUNICATION

FIELD OF THE INVENTION

The present invention relates to the field of wired communication systems, and, more specifically, to the networking of devices using telephone lines.

BACKGROUND OF THE INVENTION

FIG. 1 shows the wiring configuration for a prior-art telephone system 10 for a residence or other building, wired with a telephone line 5. Residence telephone line 5 consists of single wire pair which connects to a junction-box 16, which in turn connects to a Public Switched Telephone Network (PSTN) 18 via a cable 17, terminating in a public switch 19, apparatus which establishes and enables telephony from one telephone to another. The term "analog telephony" herein denotes traditional analog low-frequency audio voice signals typically under 3 KHz, sometimes referred to as "POTS" ("plain old telephone service"), whereas the term "telephony" in general denotes any kind of telephone service, including digital service such as Integrated Services Digital Network (ISDN). The term "high-frequency" herein denotes any frequency substantially above such analog telephony audio frequencies, such as that used for data. ISDN typically uses frequencies not exceeding 100 KHz (typically the energy is concentrated around 40 KHz). The term "telephone device" herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new telephone outlets in the home. A plurality of telephones 13a, 13b, and 13c connects to telephone line 5 via a plurality of outlets 11a, 11b, 11c, and 11d. Each outlet has a connector (often referred to as a "jack"), denoted in FIG. 1 as 12a, 12b, 12c, and 12d, respectively. Each outlet may be connected to a telephone via a connector (often referred to as a "plug"), denoted in FIG. 1 (for the three telephone illustrated) as 14a, 14b, and 14c, respectively. It is also important to note that lines 5a, 5b, 5c, 5d, and 5e are electrically the same paired conductors.

There is a requirement for using the existing telephone infrastructure for both telephone and data networking. This would simplify the task of establishing a new local area network in a home or other building, because there would be no additional wires and outlets to install. U.S. Pat. No. 4,766,402 to Crane (hereinafter referred to as "Crane") teaches a way to form a LAN over two wire telephone lines, but without the telephone service.

The concept of frequency domain/division multiplexing (FDM) is well-known in the art, and provides a means of splitting the bandwidth carried by a wire into a low-frequency band capable of carrying an analog telephony signal and a high-frequency band capable of carrying data communication or other signals. Such a mechanism is described for example in U.S. Pat. No. 4,785,448 to Reichert et al (hereinafter referred to as "Reichert"). Also is widely used are XDSL systems, primarily Asymmetric Digital Subscriber Loop (ADSL) systems.

Relevant prior art in this field is also disclosed in U.S. Pat. No. 5,896,443 to Dichter (hereinafter referred to as "Dichter"). Dichter is the first to suggest a method and apparatus for applying such a technique for residence telephone wiring, enabling simultaneously carrying telephone and data communication signals. The Dichter network is illustrated in FIG. 2, which shows a network 20 serving both telephones and a local area network. Data Terminal Equipment (DTE) units 24a, 24b and 24c are connected to the local area network via Data Communication Equipment (DCE) units 23a, 23b and 23c, respectively. Examples of Data Communication Equipment include modems, line drivers, line receivers, and transceivers. DCE units 23a, 23b and 23c are respectively connected to high pass filters (HPF) 22a, 22b and 22c. The HPF's allow the DCE units access to the high-frequency band carried by telephone line 5. In a first embodiment (not shown in FIG. 2), telephones 13a, 13b and 13c are directly connected to telephone line 5 via connectors 14a, 14b and 14c, respectively. However, in order to avoid interference to the data network caused by the telephones, a second embodiment is suggested (shown in FIG. 2), wherein low pass filters (LPF's) 21a, 21b and 21c are added to isolate telephones 13a, 13b and 13c from telephone line 5. Furthermore, a low pass filter must also be connected to Junction-Box 16, in order to filter noises induced from or to the PSTN wiring 17. As is the case in FIG. 1, it is important to note that lines 5a, 5b, 5c, 5d and 5e are electrically the same paired conductors.

The Dichter network suffers from degraded data communication performance, because of the following drawbacks:

1. Induced noise in the band used by the data communication network is distributed throughout the network. The telephone line within a building serves as a long antenna, receiving electro-magnetic noise produced from outside the building or by local equipment such as air-conditioning systems, appliances, and so forth. Electrical noise in the frequency band used by the data communication network can be induced in the extremities of the telephone line 5 (line 5e or 5a in FIG. 2) and propagated via the telephone line 5 throughout the whole system. This is liable to cause errors in the data transportation.

2. The wiring media consists of a single long wire (telephone line 5). In order to ensure a proper impedance match to this transmission-line, it is necessary to install terminators at each end of the telephone line 5. One of the advantages of using the telephone infrastructure for a data network, however, is to avoid replacing the internal wiring. Thus, either such terminators must be installed at additional cost, or suffer the performance problems associated with an impedance mismatch.

3. In the case where LPF 21 is not fitted to the telephones 13, each connected telephone appears as a non-terminated stub, and this is liable to cause undesirable signal reflections.

4. In one embodiment, an LPF 21 is to be attached to each telephone 13. In such a configuration, an additional modification to the telephone itself is required. This further makes the implementation of such system complex and costly, and defeats the purpose of using an existing telephone line and telephone sets 'as is' for a data network.

5. The data communication network used in the Dichter network supports only the 'bus' type of data communication network, wherein all devices share the same physical media. Such topology suffers from a number of drawbacks, as described in U.S. Pat. No. 5,841,360 to the present inventor, which is incorporated by reference for all purposes as if fully set forth herein. Dichter also discloses drawbacks of the bus topology, including the need for bus mastering and logic to contend with the data packet collision problem. Topologies that are preferable to the bus topology include the Token- Ring (IEEE 803), the PSIC network according to U.S. Pat. No. 5,841,360, and other point-to-point networks known in the art (such as a serial point-to-point 'daisy chain' network). Such networks are in most cases superior to 'bus' topology systems.

The above drawbacks affect the data communication performance of the Dichter network, and therefore limit the total distance and the maximum data rate such a network can support. In addition, the Dichter network typically requires a complex and therefore costly transceiver to support the data communication system. While the Reichert network relies on a star topology and does not suffer from these drawbacks of the bus topology, the star topology also has disadvantages. First, the star topology requires a complex and costly hub module, whose capacity limits the capacity of the network. Furthermore, the star configuration requires that there exist wiring from every device on the network to a central location, where the hub module is situated. This may be impractical and/or expensive to achieve, especially in the case where the wiring of an existing telephone system is to be utilized. The Reichert network is intended for use only in offices where a central telephone connection point already exists. Moreover, the Reichert network requires a separate telephone line for each separate telephone device, and this, too, may be impractical and/or expensive to achieve.

There is thus a widely-recognized need for, and it would be highly advantageous to have, a means for implementing a data communication network using existing telephone lines of arbitrary topology, which continues to support analog telephony while also allowing for improved communication characteristics by supporting a point-to-point topology network.

SUMMARY OF THE INVENTION

The present invention provides a method and apparatus for using the telephone line wiring system within residence or other building for both analog telephony service and a local area data network featuring a serial "daisy chained" or other arbitrary topology. First, the regular outlets are modified or substituted to allow splitting of the telephone line having two wires into segments such that each segment connecting two outlets is fully separated from all other segments. Each segment has two ends, to which various devices, other segments, and so forth, may be connected. A low pass filter is connected in series to each end of the segment, thereby forming a low-frequency path between the external ports of the low pass filters, utilizing the low-frequency band. Similarly, a high pass filter is connected in series to each end of the segment, thereby forming a high-frequency path between the external ports of the high pass filters, utilizing the high-frequency band. The bandwidth carried by the segments is thereby split into non-overlapping frequency bands, and the distinct paths can be interconnected via the high pass filters and low pass filters as coupling and isolating devices to form different paths. Depending on how the devices and paths are selectively connected, these paths may be simultaneously different for different frequencies. A low-frequency band is allocated to regular telephone service (analog telephony), while a high-frequency band is allocated to the data communication network. In the low-frequency (analog telephony) band, the wiring composed of the coupled low-frequency paths appears as a normal telephone line, in such a way that the low-frequency (analog telephony) band is coupled among all the segments and is accessible to telephone devices at any outlet, whereas the segments may remain individually isolated in the high-frequency (data) band, so that in this data band the communication media, if desired, can appear to be point-to-point (such as a serialized "daisy chain") from one outlet to the next. The term "low pass filter" herein denotes any device that passes signals in the low-frequency (analog telephony) band but blocks signals in the high-frequency (data) band. Conversely, the term "high pass filter" herein denotes any device that passes signals in the high-frequency (data) band but blocks signals in the low-frequency (analog telephony) band. The term "data device" herein denotes any apparatus that handles digital data, including without limitation modems, transceivers, Data Communication Equipment, and Data Terminal Equipment.

A network according to the present invention allows the telephone devices to be connected as in a normal telephone installation (i.e., in parallel over the telephone lines), but can be configured to virtually any desired topology for data transport and distribution, as determined by the available existing telephone line wiring and without being constrained to any predetermined data network topology. Moreover, such a network offers the potential for the improved data transport and distribution performance of a point-to-point network topology, while still allowing a bus-type data network topology in all or part of the network if desired. This is in contrast to the prior art, which constrains the network topology to a predetermined type.

A network according to the present invention may be used advantageously when connected to external systems and networks, such as xDSL, ADSL, as well as the Internet.

In a first embodiment, the high pass filters are connected in such a way to create a virtual 'bus' topology for the high-frequency band, allowing for a local area network based on DCE units or transceivers connected to the segments via the high pass filters. In a second embodiment, each segment end is connected to a dedicated modem, hence offering a serial point-to-point daisy chain network. In all embodiments of the present invention, DTE units or other devices connected to the DCE units can communicate over the telephone line without interfering with, or being affected by, simultaneous analog telephony service. Unlike prior-art networks, the topology of a network according to the present invention is not constrained to a particular network topology determined in advance, but can be adapted to the configuration of an existing telephone line installation. Moreover, embodiments of the present invention that feature point-to-point data network topologies exhibit the superior performance characteristics that such topologies offer over the bus network topologies of the prior art, such as the Dichter network and the Crane network.

Therefore, according to the present invention there is provided a network for telephony and data communication including: (a) at least one electrically-conductive segment containing at least two distinct electrical conductors operative to conducting a low-frequency telephony band and at least one high-frequency data band, each of the segments having a respective first end and a respective second end; (b) a first low pass filter connected in series to the respective first end of each of the segments, for establishing a low-frequency path for the low-frequency telephony band; (c) a second low pass filter connected in series to the respective second end of each of the segments, for establishing a low-frequency path for the low-frequency telephony band; (d) a first high pass filter connected in series to the respective first end of each of the segments, for establishing a high-frequency path for the at least one high-frequency data band; (e) a second high pass filter connected in series to the respective second end of each of the segments, for establishing a high-frequency path for the at least one high-frequency data band; and (f) at least two outlets each operative to connecting at least one telephone device to at least one of the low-frequency paths, and at least two of the at least two outlets being operative to connecting at least one data device to at least one of the high-frequency paths; wherein each of the segments electrically connects two of the outlets; and each of the outlets that is connected to more than one of the segments couples the low-frequency telephony band among each of the connected segments.

BRIEF DESCRIPTION OF THE DRAWINGS

In order to understand the invention and to see how the same may be carried out in practice, some preferred embodiments will now be described, by way of non-limiting example only, with reference to the accompanying drawings, wherein.

DESCRIPTION OF THE PREFERRED EMBODIMENTS

Figure 1:
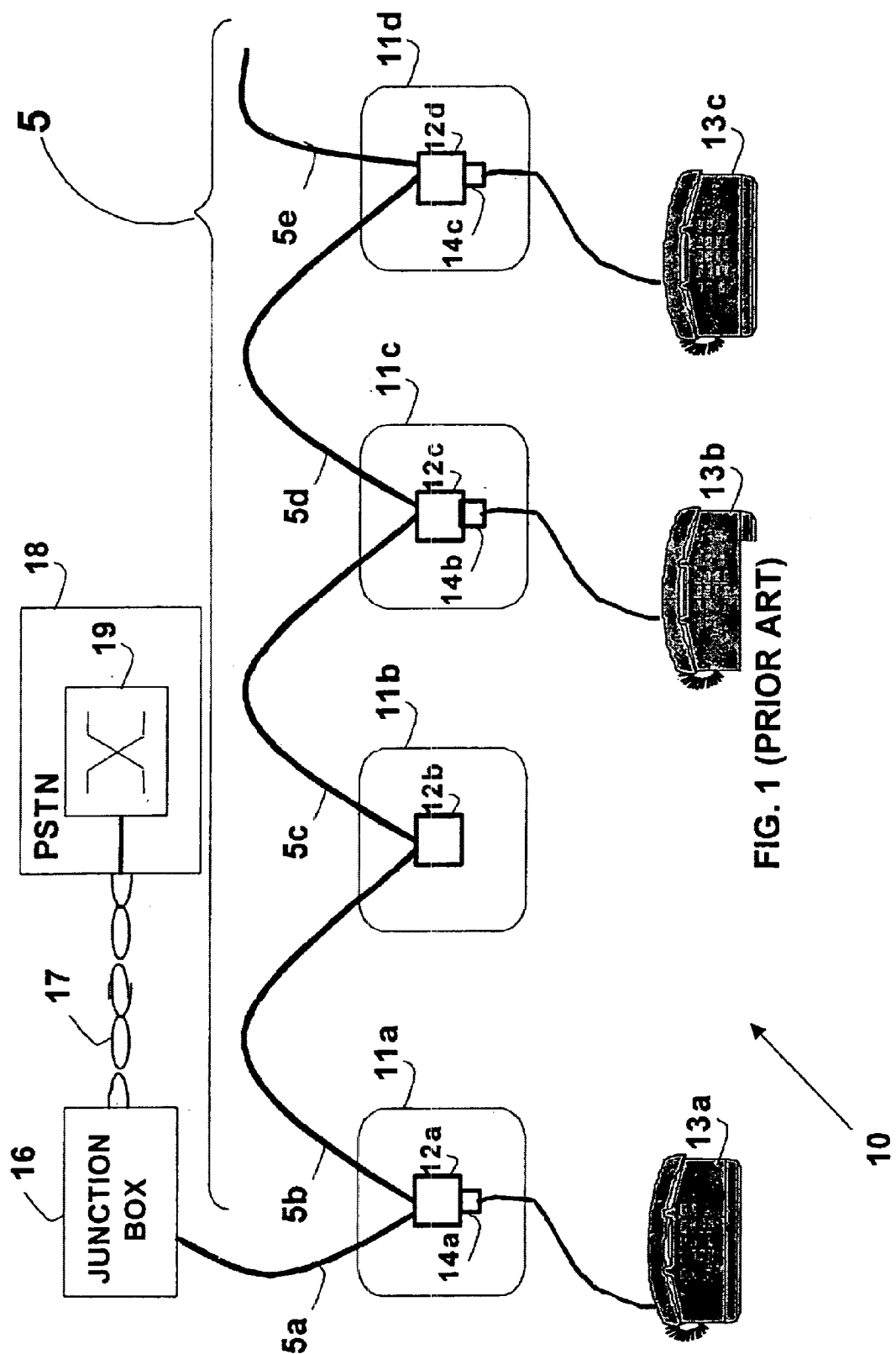
FIG. 1 shows a common prior art telephone line wiring configuration for a residence or other building.
Figure 2:
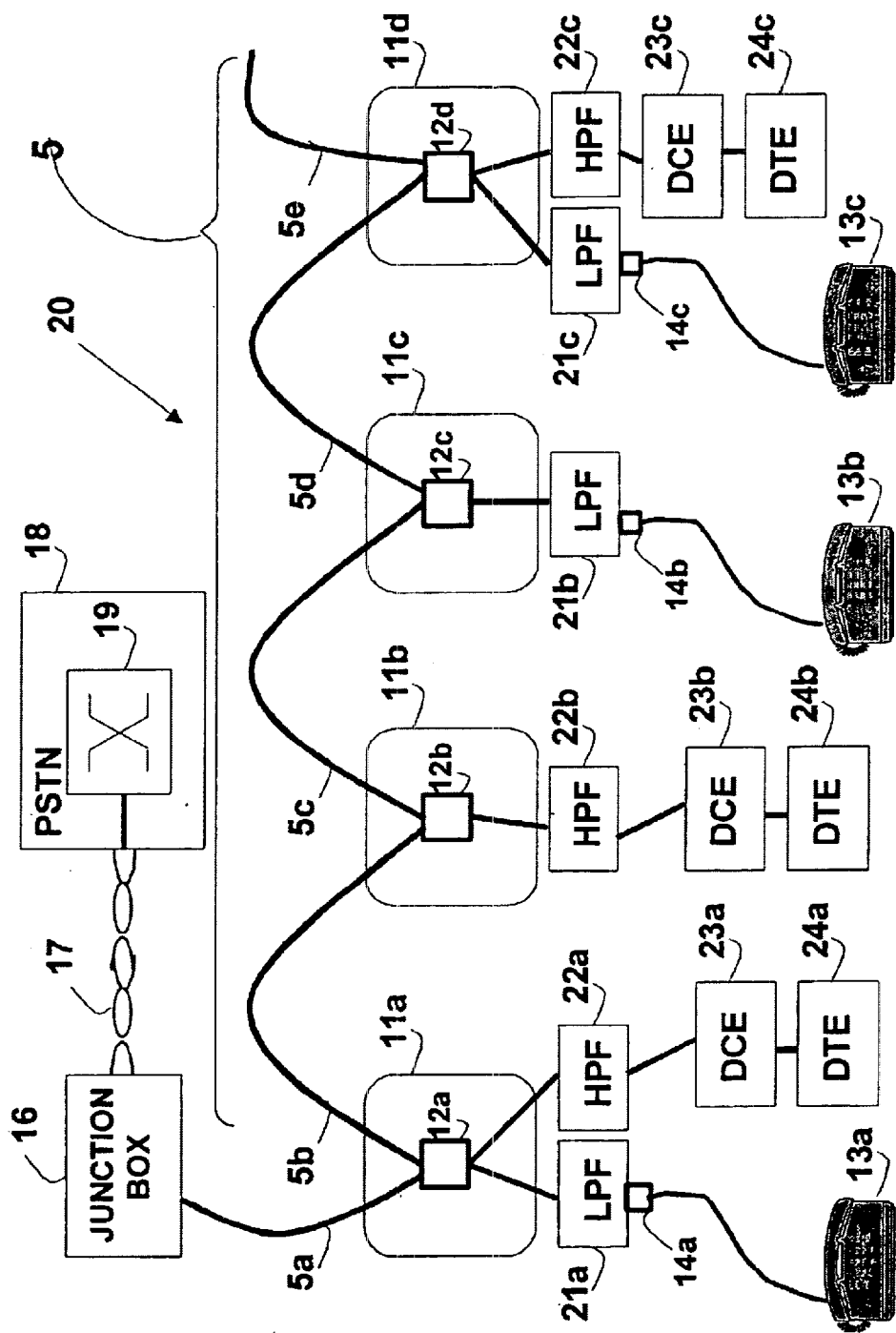
FIG. 2 shows a prior art local area network based on telephone line wiring for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components which are common to different embodiments or configurations.

Figure 3:
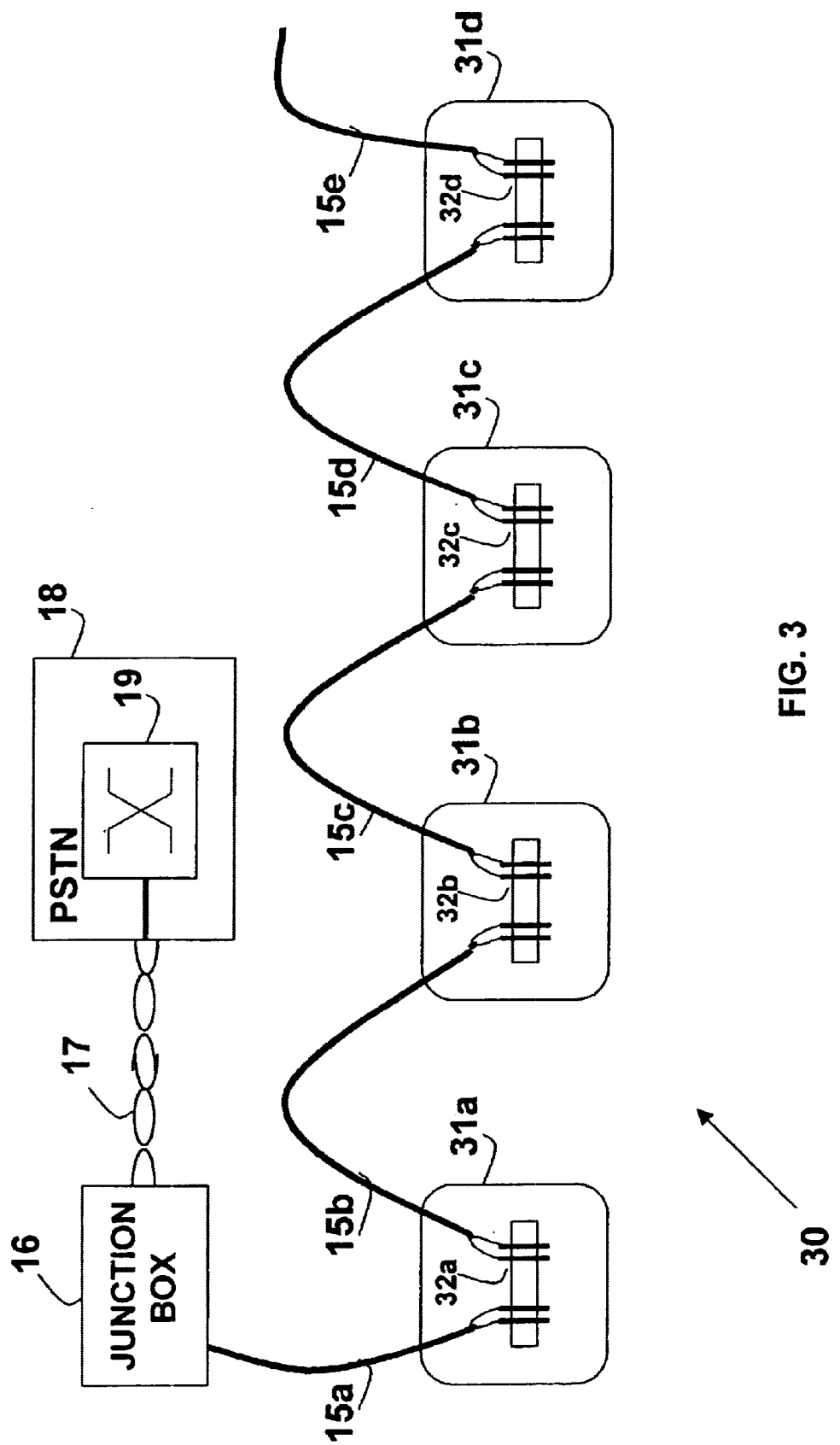
FIG. 3 shows modifications to telephone line wiring according to the present invention for a local area network.

The basic concept of the invention is shown in FIG. 3. A network 30 is based on modified telephone outlets 31a, 31b, 31c and 31d. The modification relates to wiring changes at the outlets and substituting the telephone connectors, shown as connectors 32a, 32b, 32c and 32d in outlets 31a, 31b, 31c and 31d respectively. No changes are required in the overall telephone line layout or configuration. The wiring is changed by separating the wires at each outlet into distinct segments of electrically-conducting media. Thus, each segment connecting two outlets can be individually accessed from either end. In the prior art Dichter network, the telephone wiring is not changed, and is continuously conductive from junction box 16 throughout the system. According to the present invention, the telephone line is broken into electrically distinct isolated segments 15a, 15b, 15c, 15d and 15e, each of which connects two outlets. In order to fully access the media, each of connectors 32a, 32b, 32c and 32d must support four connections, two in each segment. This modification to the telephone line can be carried out by replacing each of the outlets 31a, 31b, 31c and 31d, replacing only the connectors 32a, 32b, 32c and 32d, or simply by cutting the telephone line wiring at the outlet. As will be explained later, these modifications need be performed only to those outlets which connect to data network devices, but are recommended at all other outlets. A minimum of two outlets must be modified, enabling data communication between those outlets only.

Figure 4:
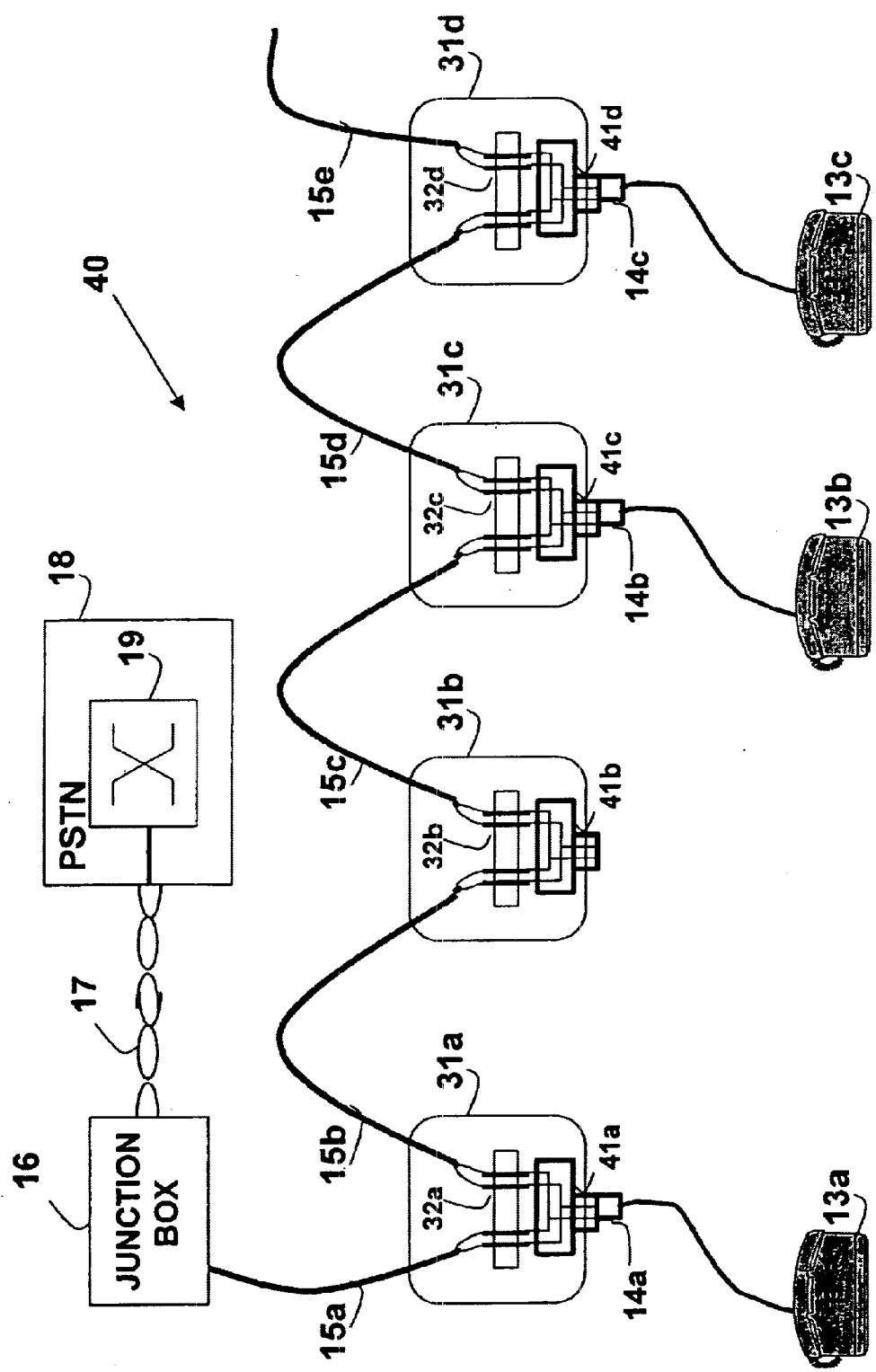
FIG. 4 shows modifications to telephone line wiring according to the present invention, to support regular telephone service operation.

FIG. 4 shows how a network 40 of the present invention continues to support the regular telephone service, by the installation of jumpers 41a, 41b, 41c and 41d in modified outlets 31a, 31b, 31c and 31d respectively. At each outlet where they are installed, the jumpers connect both segment ends and allow telephone connection to the combined segment. Installation of a jumper effects a re-connection of the split telephone line at the point of installation. Installation of jumpers at all outlets would reconstruct the prior art telephone line configuration as shown in FIG. 1. Such jumpers can be add-ons to the outlets, integrated within the outlets, or integrated into a separate module. Alternately, a jumper can be integrated within a telephone set, as part of connector 14. The term "jumper" herein denotes any device for selectively coupling or isolating the distinct segments in a way that is not specific to the frequency band of the coupled or isolated signals. Jumper 41 can be implemented with a simple electrical connection between the connection points of connector 32 and the external connection of the telephone.

As described above, jumpers 41 are to be installed in all outlets which are not required for connection to the data communication network. Those outlets which are required to support data communication connections, however, will not use jumper 41 but rather a splitter 50, shown in FIG. 5. Such a splitter connects to both segments in each modified outlet 31 via connector 32, using a port 54 for a first connection and a port 55 for a second connection. Splitter 50 has two LPF's for maintaining the continuity of the audio/telephone low-frequency band. After low pass filtering by LPF 51a for the port 54 and LPF 51b for port 55, the analog telephony signals are connected together and connected to a telephone connector 53. Hence, from the point of view of the telephone signal, the splitter 50 provides the same continuity and telephone access provided by the jumper 41. On the other hand, the data communication network employs the high-frequency band, access to which is made via HPF's 52a and 52b. HPF 52a is connected to port 54 and HPF 52b is connected to port 55. The high pass filtered signals are not passed from port 54 to port 55, but are kept separate, and are routed to a connector 56 and a connector 57, respectively. The term "splitter" herein denotes any device for selectively coupling or isolating the distinct segments that is specific to the frequency band of the coupled or isolated signals.

Therefore, when installed in an outlet, the splitter 50 serves two functions. With respect to the low-frequency analog telephony band, splitter 50 establishes a coupling to effect the prior-art configuration shown in FIG. 1, wherein all telephone devices in the premises are connected virtually in parallel via the telephone line, as if the telephone line were not broken into segments. On the other hand, with respect to the high-frequency data communication network, splitter 50 establishes electrical isolation to effect the configuration shown in FIG. 3, wherein the segments are separated, and access to each segment end is provided by the outlets. With the use of splitters, the telephone system and the data communication network are actually decoupled, with each supporting a different topology.

Figure 6:
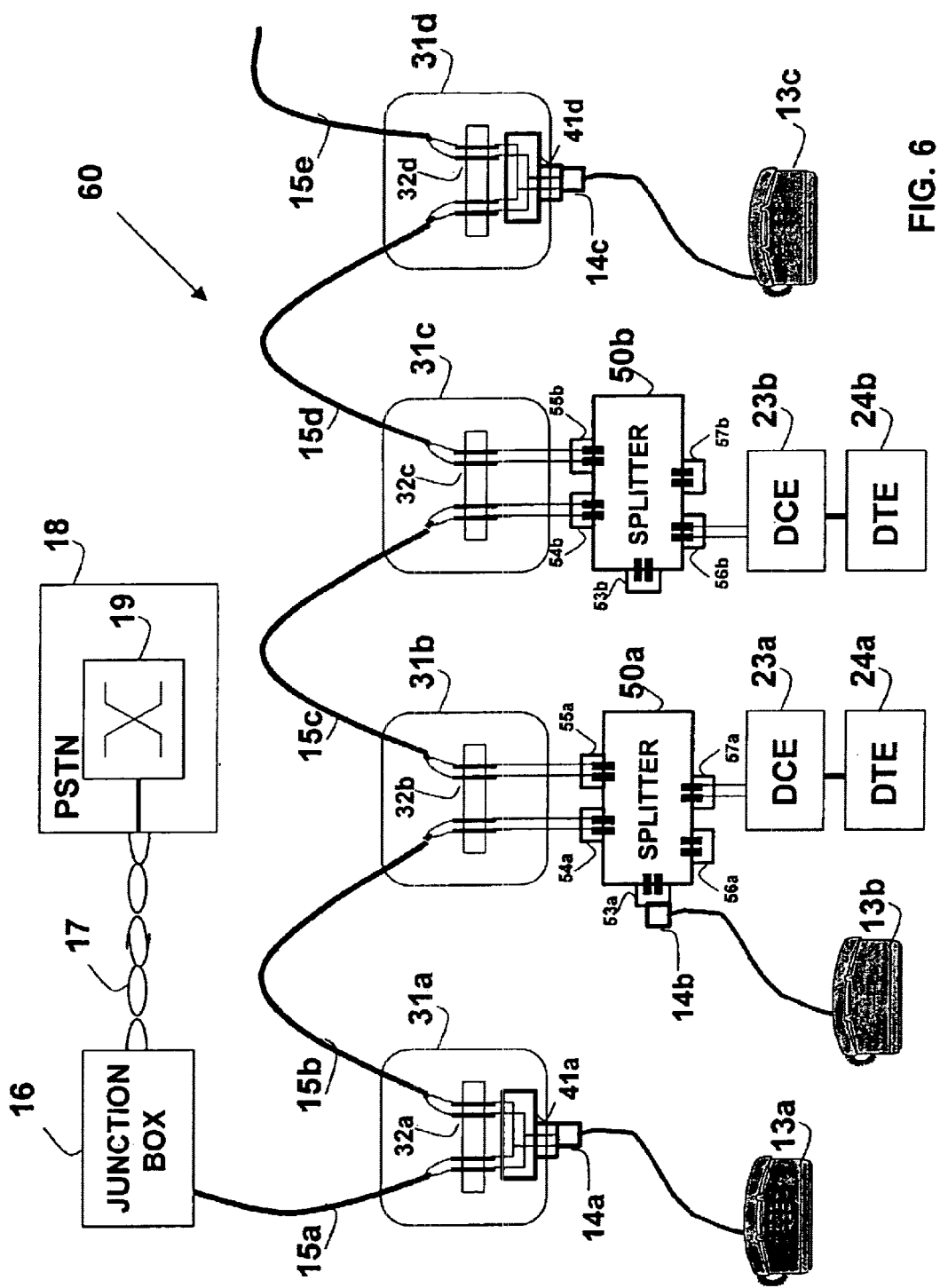
FIG. 6 shows a local area network based on telephone lines according to the present invention, wherein the network supports two devices at adjacent outlets.

FIG. 6 shows a first embodiment of a data communication network 60 between two DTE units 24a and 24b, connected to adjacent outlets 31b and 31c, which are connected together via a single segment 15c. Splitters 50a and 50b are connected to outlets 31b and 31c via connectors 32b and 32c, respectively. As explained above, the splitters allow transparent audio/telephone signal connection. Thus, for analog telephony, the telephone line remains virtually unchanged, allowing access to telephone external connection 17 via junction box 16 for telephones 13a and 13c. Likewise, telephone 13b connected via connector 14b to a connector 53a on splitter 50a, is also connected to the telephone line. In a similar way, an additional telephone can be added to outlet 31c by connecting the telephone to connector 53b on splitter 50b. It should be clear that connecting a telephone to an outlet, either via jumper 41 or via splitter 50 does not affect the data communication network.

Figure 5:
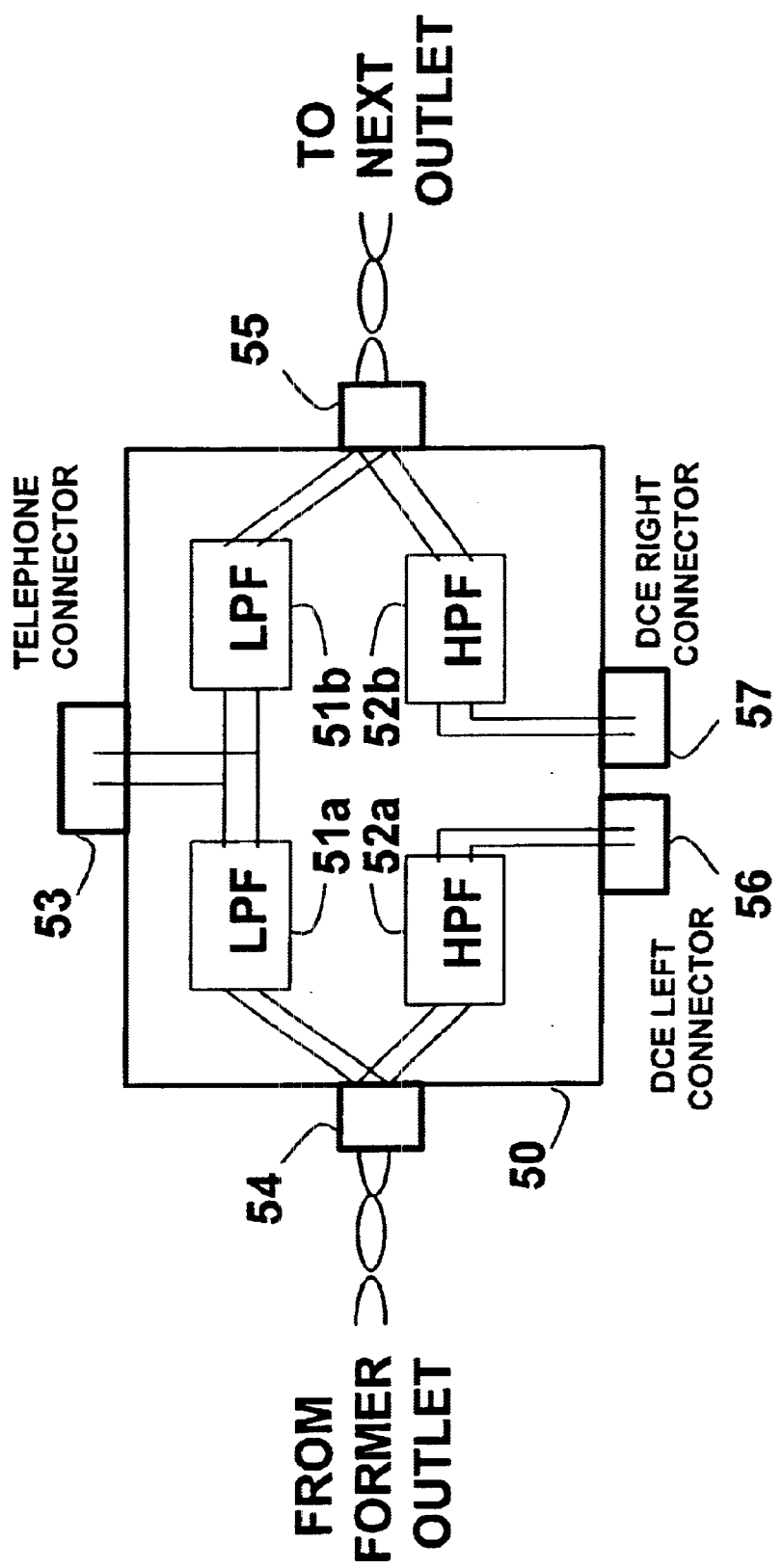
FIG. 5 shows a splitter according to the present invention.

Network 60 (FIG. 6) supports data communication by providing a communication path between port 57a of splitter 50a and port 56b of splitter 50b. Between these ports there exists a point-to-point connection for the high-frequency portion of the signal spectrum, as determined by HPF 52a and 52b within splitters 50 (FIG. 5). This path can be used to establish a communication link between DTE units 24a and 24b, by means of DCE units 23a and 23b, which are respectively connected to ports 57a and 56b. The communication between DTE units 24a and 24b can be unidirectional, half-duplex, or full-duplex. The only limitation imposed on the communication system is the capability to use the high-frequency portion of the spectrum of segment 15c. As an example, the implementation of data transmission over a telephone line point-to-point system described in Reichert can also be used in network 60. Reichert implements both LPF and HPF by means of a transformer with a capacitor connected in the center-tap, as is well known in the art. Similarly, splitter 50 can be easily implemented by two such circuits, one for each side.

It should also be apparent that HPF 52a in splitter 50a and HPF 52b in splitter 50b can be omitted, because neither port 56a in splitter 50a nor port 57b in splitter 50b is connected.

Network 60 provides clear advantages over the networks described in hitherto-proposed networks. First, the communication media supports point-to-point connections, which are known to be superior to multi-tap (bus) connections for communication performance. In addition, terminators can be used within each splitter or DCE unit, providing a superior match to the transmission line characteristics. Furthermore, no taps (drops) exists in the media, thereby avoiding impedance matching problems and the reflections that result therefrom.

Moreover, the data communication system in network 60 is isolated from noises from both the network and the 'left' part of the telephone network (Segments 15a and 15b), as well as noises induced from the 'right' portion of the network (Segments 15d and 15e). Such isolation is not provided in any prior-art implementation. Dichter suggests installation of a low pass filter in the junction box, which is not a satisfactory solution since the junction box is usually owned by the telephone service provider and cannot always be accessed. Furthermore, safety issues such as isolation, lightning protection, power-cross and other issues are involved in such a modification.

Implementing splitter 50 by passive components only, such as two transformers and two center-tap capacitors, is also advantageous, since the reliability of the telephone service will not be degraded, even in the case of failure in any DCE unit, and furthermore requires no external power. This accommodates a 'life-line' function, which provides for continuous telephone service even in the event of other system malfunction (e.g. electrical failures).

The splitter 50 can be integrated into outlet 31. In such a case, outlets equipped with splitter 50 will have two types of connectors: One regular telephone connector based on port 53, and one or two connectors providing access to ports 56 and 57 (a single quadruple-circuit connector or two double-circuit connectors). Alternatively, splitter 50 can be an independent module attached as an add-on to outlet 31. In another embodiment, the splitter is included as part of DCE 23. However, in order for network 60 to operate properly, either jumper 41 or splitter 50 must be employed in outlet 31 as modified in order to split connector 32 according to the present invention, allowing the retaining of regular telephone service.

Figure 7:
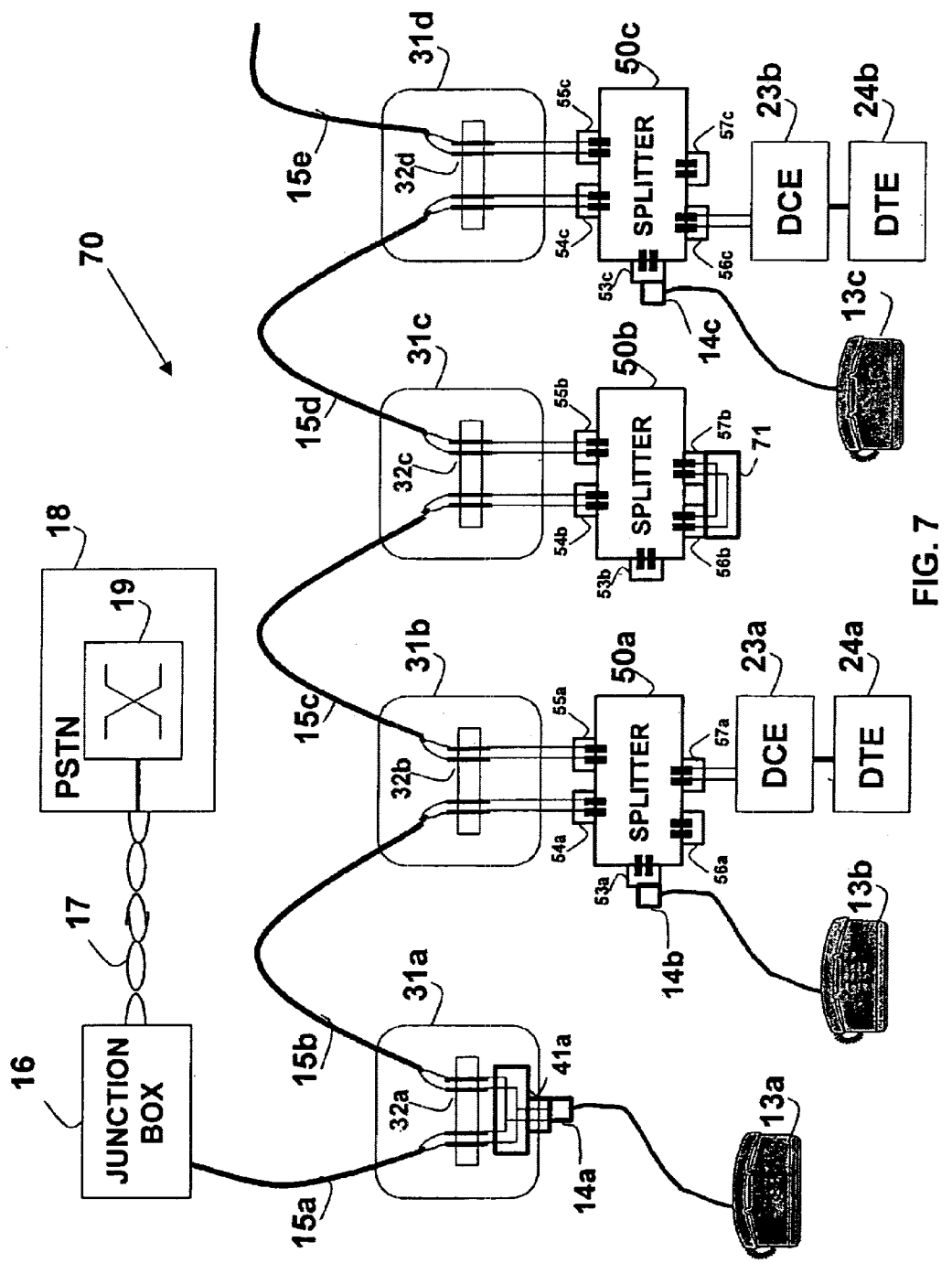
FIG. 7 shows a first embodiment of a local area network based on telephone lines according to the present invention, wherein the network supports two devices at non-adjacent outlets.

FIG. 7 also shows data communication between two DTE units 24a and 24b in a network 70. However, in the case of network 70, DTE units 24a and 24b are located at outlets 31b and 31d, which are not directly connected, but have an additional outlet 31c interposed therebetween. Outlet 31c is connected to outlet 31b via a segment 15c, and to outlet 31d via a segment 15d.

In one embodiment of network 70, a jumper (not shown, but similar to jumper 41 in FIG. 4) is connected to a connector 32c in outlet 31c. The previous discussion regarding the splitting of the signal spectrum also applies here, and allows for data transport between DTE units 24a and 24b via the high-frequency portion of the spectrum across segments 15c and 15d. When only jumper 41 is connected at outlet 31c, the same point-to-point performance as previously discussed can be expected; the only influence on communication performance is from the addition of segment 15d, which extends the length of the media and hence leads to increased signal attenuation. Some degradation, however, can also be expected when a telephone is connected to jumper 41 at outlet 31c. Such degradation can be the result of noise produced by the telephone in the high-frequency data communication band, as well as the result of the addition of a tap caused by the telephone connection, which usually has a non-matched termination. Those problems can be overcome by installing a low pass filter in the telephone.

In a preferred embodiment of network 70, a splitter 50b is installed in outlet 31c. Splitter 50b provides the LPF functionality, and allows for connecting a telephone via connector 53b. However, in order to allow for continuity in data communication, there must be a connection between the circuits in connectors 56b and 57b. Such a connection is obtained by a jumper 71, as shown in FIG. 7. Installation of splitter 50b and jumper 71 provides good communication performance, similar to network 60 (FIG. 6). From this discussion of a system wherein there is only one unused outlet between the outlets to which the DTE units are connected, it should be clear that the any number of unused outlets between the outlets to which the DTE units are connected can be handled in the same manner.

Figure 8:
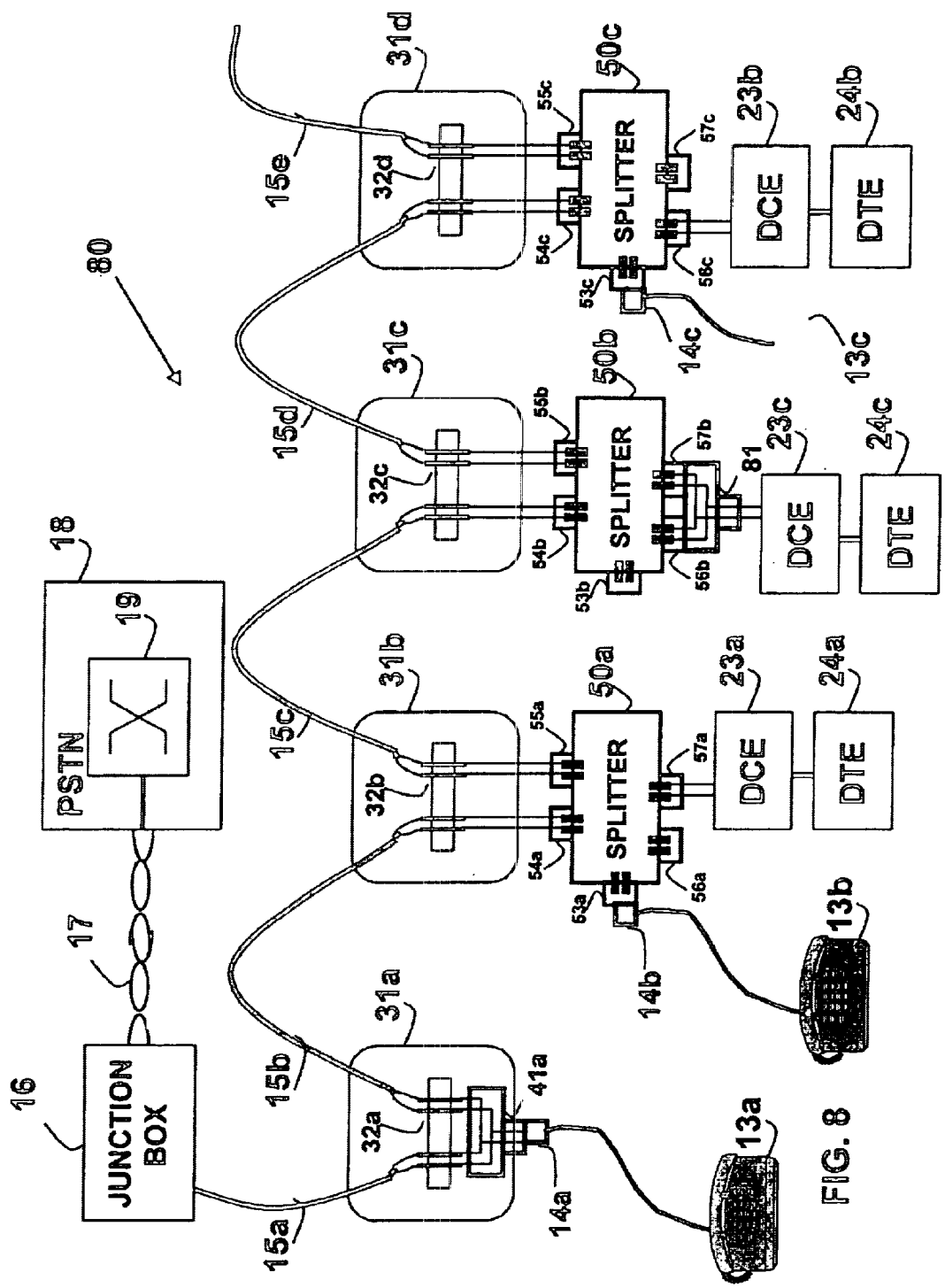
FIG. 8 shows a second embodiment of a local area network based on telephone lines according to the present invention, wherein the network supports three devices at adjacent outlets.

For the purpose of the foregoing discussions, only two communicating DTE units have been described. However, the present invention can be easily applied to any number of DTE units. FIG. 8 illustrates a network 80 supporting three DTE units 24a, 24b and 24c, connected thereto via DCE units 23a, 23b and 23c, respectively. The structure of network 80 is the same as that of network 70 (FIG. 7), with the exception of the substitution of jumper 71 with a jumper 81. Jumper 81 makes a connection between ports 56b and 57b in the same way as does jumper 71. However, in a manner similar to that of jumper 41 (FIG. 4), jumper 81 further allows for an external connection to the joined circuits, allowing the connection of external unit, such as a DCE unit 23c. In this way, segments 15c and 15d appear electrically-connected for high-frequency signals, and constitute media for a data communication network connecting DTE units 24a, 24b and 24c. Obviously, this configuration can be adapted to any number of outlets and DTE units. In fact, any data communication network which supports a 'bus' or multi-point connection over two-conductor media, and which also makes use of the higher-frequency part of the spectrum can be used. In addition, the discussion and techniques explained in the Dichter patent are equally applicable here. Some networks, such as Ethernet IEEE 802.3 interface 10BaseT and 100BaseTX, require a four-conductor connection, two conductors (usually single twisted-wire pair) for transmitting, and two conductors (usually another twisted-wire pair) for receiving. As is known in the art, a four-to-two wires converter (commonly known as hybrid) can be used to convert the four wires required into two, thereby allowing network data transport over telephone lines according to the present invention.

As with jumper 41 (FIG. 4), jumper 81 can be an integral part of splitter 50, an integral part of DCE 23, or a separate component.

In order to simplify the installation and operation of a network, it is beneficial to use the same equipment in all parts of the network. One such embodiment supporting this approach is shown in for a set of three similar outlets in FIG. 8, illustrating network 80. In network 80, outlets 31b, 31c, and 31d are similar and are all used as part of the data communication network. Therefore for uniformity, these outlets are all coupled to splitters 50a, 50b, and 50c respectively, to which jumpers are attached, such as a jumper 81 attached to splitter 50b (the corresponding jumpers attached to splitter 50a and splitter 50c have been omitted from FIG. 8 for clarity), and thus provide connections to local DCE units 23a, 23c, and 23b, respectively. In a preferred embodiment of the present invention, all outlets in the building will be modified to include both splitter 50 and jumper 81 functionalities. Each such outlet will provide two connectors: one connector coupled to port 53 for a telephone connection, and the other connector coupled to jumper 81 for a DCE connection.

In yet another embodiment, DCE 23 and splitter 50 are integrated into the housing of outlet 31, thereby offering a direct DTE connection. In a preferred embodiment, a standard DTE interface is employed.

Figure 9:
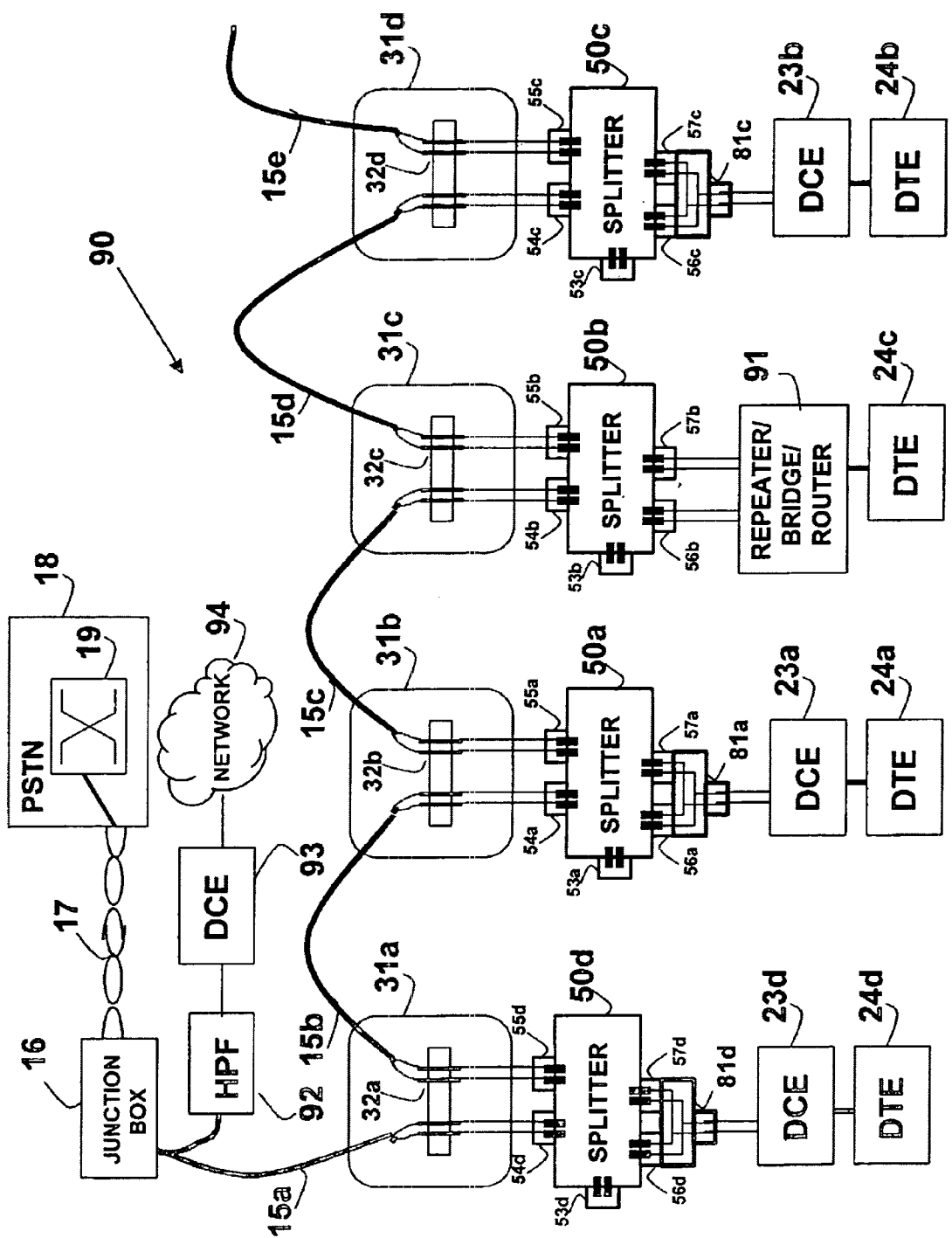
FIG. 9 shows third embodiment of a local area network based on telephone lines according to the present invention, wherein the network is a us type network.

In most 'bus' type networks, it is occasionally required to split the network into sections, and connect the sections via repeaters (to compensate for long cabling), via bridges (to decouple each section from the others), or via routers. This may also be done according to the present invention, as illustrated in FIG. 9 for a network 90, which employs a repeater/bridge/router unit 91. Unit 91 can perform repeating, bridging, routing, or any other function associated with a split between two or more networks. As illustrated, a splitter 50b is coupled to an outlet 31c, in a manner similar to the other outlets and splitters of network 90. However, at splitter 50b, no jumper is employed. Instead, a repeater/bridge/router unit 91 is connected between port 56b and port 57b, thereby providing a connection between separate parts of network 90. Optionally, unit 91 can also provide an interface to DTE 24c for access to network 90.

FIG. 9 also demonstrates the capability of connecting to external DTE units or networks, via a high pass filter 92 connected to a line 15a. Alternatively, HPF 92 can be installed in junction box 16. HPF 92 allows for additional external units to access network 90. As shown in FIG. 9, HPF 92 is coupled to a DCE unit 93, which in turn is connected to a network 94. In this configuration, the local data communication network in the building becomes part of network 94. In one embodiment, network 94 offers ADSL service, thereby allowing the DTE units 24d, 24a, 24c and 24b within the building to communicate with the ADSL network. The capability of communicating with external DTE units or networks is equally applicable to all other embodiments of the present invention, but for clarity is omitted from the other drawings.

Figure 10:
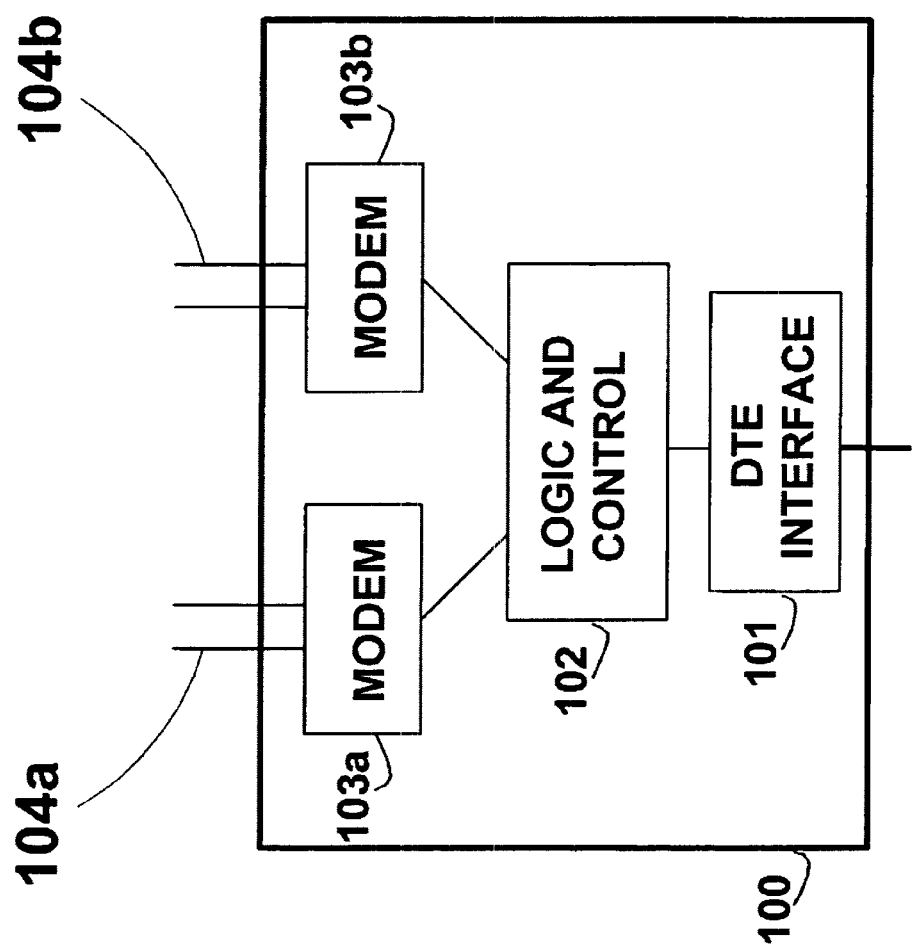
FIG. 10 shows a node of local area network based on telephone lines according to the present invention.

While the foregoing relates to data communication networks employing bus topology, the present invention can also support networks where the physical layer is distinct within each communication link. Such a network can be a Token-Passing or Token-Ring network according to IEEE 802, or preferably a PSIC network as described in U.S. Pat. No. 5,841,360 to the present inventor, which details the advantages of such a topology. FIG. 10 illustrates a node 100 for implementing such a network. Node 100 employs two modems 103a and 103b, which handle the communication physical layer. Modems 103a and 103b are independent, and couple to dedicated communication links 104a and 104b, respectively. Node 100 also features a DTE interface 101 for connecting to a DTE unit (not shown). A control and logic unit 102 manages the higher OSI layers of the data communication above the physical layer, processing the data to and from a connected DTE and handling the network control. Detailed discussion about such node 100 and the functioning thereof can be found in U.S. Pat. No. 5,841,360 and other sources known in the art.

Figure 11:
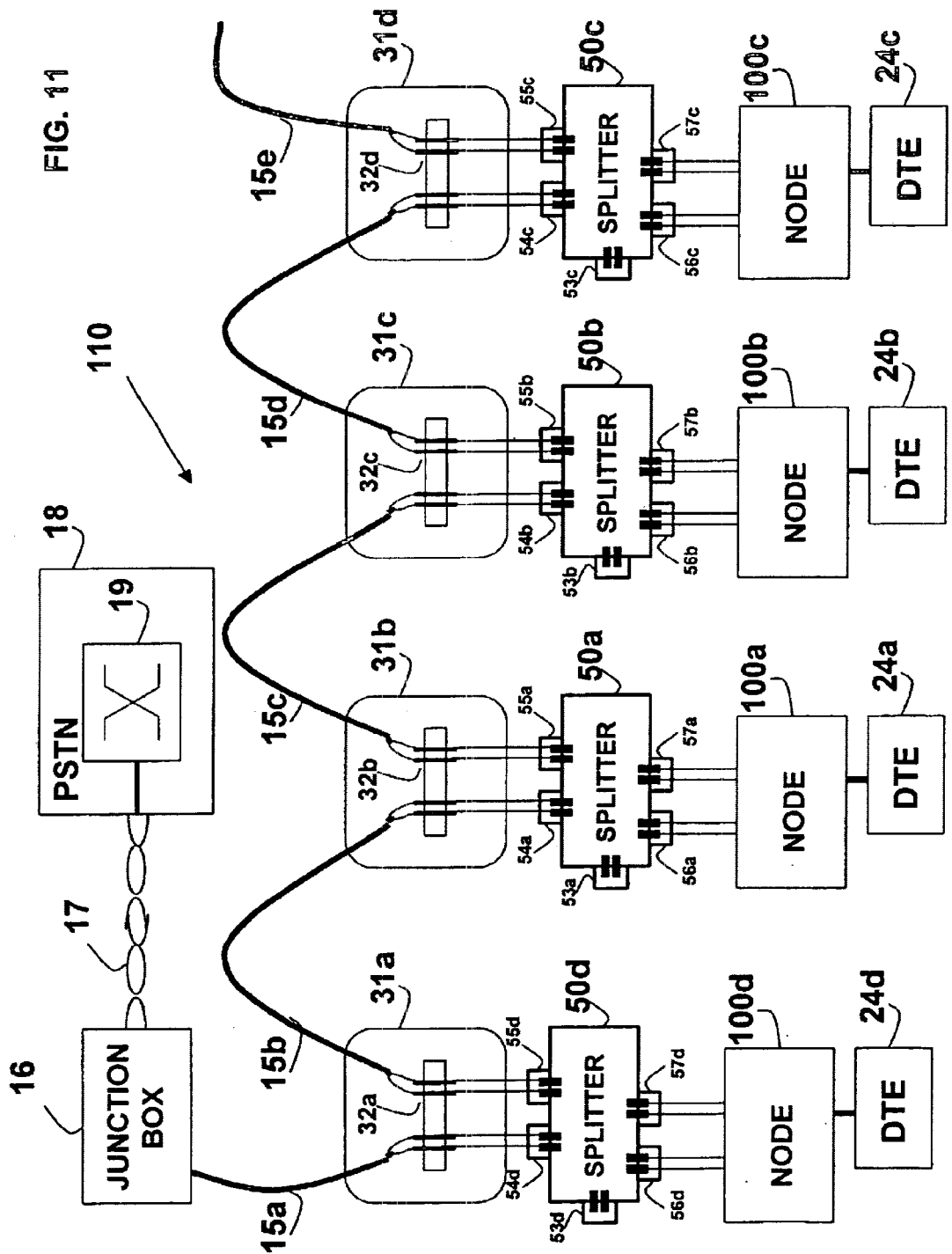
FIG. 11 shows a fourth embodiment of a local area network based on telephone lines according to the present invention.

FIG. 11 describes a network 110 containing nodes 100d, 100a, 100b and 100c coupled directly to splitters 50d, 50a, 50b and 50c, which in turn are coupled to outlets 31a, 31b, 31c and 31d respectively. Each node 100 has access to the corresponding splitter 50 via two pairs of contacts, one of which is to connector 56 and the other of which is to connector 57. In this way, for example, node 100a has independent access to both segment 15b and segment 15c. This arrangement allows building a network connecting DTE units 24d, 24a, 24b and 24c via nodes 100d, 100a, 100b and 100c, respectively.

For clarity, telephones are omitted from FIGS. 9 and 11, but it will be clear that telephones can be connected or removed without affecting the data communication network. Telephones can be connected as required via connectors 53 of splitters 50. In general, according to the present invention, a telephone can be connected without any modifications either to a splitter 50 (as in FIG. 8) or to a jumper 41 (as in FIG. 4).

Furthermore, although the present invention has so far been described with a single DTE connected to a single outlet, multiple DTE units can be connected to an outlet, as long as the corresponding node or DCE supports the requisite number of connections. Moreover, access to the communication media can be available for plurality of users using multiplexing techniques known in the art. In the case of time domain/division multiplexing (TDM) the whole bandwidth is dedicated to a specific user during a given time interval. In the case of frequency domain/division multiplexing (FDM), a number of users can share the media simultaneously, each using different non-overlapping portions of the frequency spectrum.

In addition to the described data communication purposes, a network according to the present invention can be used for control (e.g. home automation), sensing, audio, or video applications, and the communication can also utilize analog signals (herein denoted by the term "analog communication"). For example, a video signal can be transmitted in analog form via the network.

While the present invention has been described in terms of outlets which have only two connections and therefore can connect only to two other outlets (i.e., in a serial, or "daisy chain" configuration), the concept can also be extended to three or more connections. In such a case, each additional connecting telephone line must be broken at the outlet, with connections made to the conductors thereof, in the same manner as has been described and illustrated for two segments. A splitter for such a multi-segment segment application should use one low pass filter and one high pass filter for each segment connection.

The present invention has also been described in terms of media having a single pair of wires, but can also be applied for more conductors. For example, ISDN employs two pairs for communication. Each pair can be used individually for a data communication network as described above.

Also as explained above, an outlet 31 according to the invention (FIG. 3) has a connector 32 having at least four connection points. As an option, jumper 41 (FIG. 4), splitter 50 (FIG. 5), or splitter 50 with jumper 81 (FIG. 8), low pass filters, high pass filters, or other additional hardware may also be integrated or housed internally within outlet 31. Alternatively, these devices may be external to the outlet. Moreover, the outlet may contain standard connectors for devices, such as DTE units. In one embodiment, only passive components are included within the outlet. For example, splitter 50 can have two transformers and two capacitors (or an alternative implementation consisting of passive components). In another embodiment, the outlet may contain active, power-consuming components. Three options can be used for providing power to such circuits:

1. Local powering: In this option, supply power is fed locally to each power-consuming outlet. Such outlets must be modified to support connection for input power.

2. Telephone power: In both POTS and ISDN telephone networks, power is carried in the lines with the telephone signals. This power can also be used for powering the outlet circuits, as long as the total power consumption does not exceed the POTS/ISDN system specifications. Furthermore, in some POTS systems the power consumption is used for OFF-HOOK/ON-HOOK signaling. In such a case, the network power consumption must not interfere with the telephone logic.

3. Dedicated power carried in the media: In this option, power for the data communication related components is carried in the communication media. For example, power can be distributed using 5 kHz signal. This frequency is beyond the telephone signal bandwidth, and thus does not interfere with the telephone service. The data communication bandwidth, however, be above this 5 kHz frequency, again ensuring that there is no interference between power and signals.

While the invention has been described with respect to a limited number of embodiments, it will be appreciated that many variations, modifications and other applications of the invention may be made.

What is claimed is:

1. A network for telephony and high frequency communication comprising:
    (1) a plurality of electrically-conductive segments each containing at least two distinct electrical conductors operative for conducting a low-frequency telephony band and at least one high-frequency band, each of said segments having a respective first end and a respective second end;
    (2) a first low pass filter coupled in series to the respective first end of a selected one of said said segments, for establishing a low-frequency path for said low-frequency telephony band;
    (3) a second low pass filter coupled in series to the respective second end of said selected one of said segments, for establishing a low-frequency path for said low-frequency telephony band;
    (4) a first high pass filter coupled in series to the respective first end of said selected one of said segments, for establishing a high-frequency path for said at least one high-frequency band;
    (5) a second high pass filter coupled in series to the respective second end of said selected one of said segments, for establishing a high-frequency path for said at least one high-frequency band; and
    (6) means operative for coupling at least one telephone device to at least one of said low-frequency paths, and for coupling at least one high frequency device to at least one of said high-frequency paths;
    wherein:
    said two distinct electrical conductors at said first end of said selected one of said segments are coupled only to said first low pass filter and said first high pass filter and said two distinct electrical conductors at said second end of said selected one of said segments are coupled only to said second low pass filter and said second high pass filter.

2. The network as in claim 1 wherein each said segment is a telephone line.

3. The network as in claim 1 wherein the telephony is analog telephony.

4. The network as in claim 1 wherein:
    (1) the telephony is ISDN;
    (2) said selected one of said segments contains at least four separate electrical conductors; and
    (3) at least two of said distinct electrical conductors are operative for carrying data.

5. The network as in claim 1, wherein at least one of said high-frequency bands is operative to carrying analog communication.

6. The network as in claim 1, wherein at least one of said low pass filters is internal to an outlet.

7. The network as in claim 1, wherein at least one of said high pass filters is internal to an outlet.

8. The network as in claim 1, wherein said first low pass filter is coupled to a further low pass filter.

9. The network as in claim 1, wherein at least one of said low pass filters comprises a center-tap transformer and a capacitor.

10. The network as in claim 1, wherein at least one of said high pass filters comprises a center-tap transformer and a capacitor.

11. The network as in claim 1, furthermore coupled to a Digital Subscriber Loop (DSL) system.

12. The network as in claim 11, wherein said DSL system is an Asymmetric Digital Subscriber Loop (ADSL) system.

13. The network as in claim 1, furthermore connected to the Internet.

14. An outlet for connecting devices to a telephone line for telephony and high frequency communications, the telephone line having at least two electrically conductive segments each containing two distinct electrical conductors operative for conducting a low-frequency telephony band and a high-frequency band, the outlet comprising:

first and second low pass filters for conducting signals in the low-frequency telephony band, each of said low pass filters having first and second ports, said first port of each of said low pass filters being coupled to said two distinct conductors of a respective one of said electrically conductive segments and said second port of said first low pass filter being conductively coupled to said second port of said second low pass filter; and first and second high pass filters for conducting signals in the high-frequency band, each of said high pass filters having first and second ports, said first port of each of said high pass filters being coupled to said first port of a respective one of said low pass filters, said second port of each of said high pass filters being coupled to a respective high frequency connector, and said second ports of said high pass filters being electrically separated from one another.

15. The outlet as in claim 14, wherein each of said low pass filters is housed internally in said outlet.

16. The outlet as in claim 14, wherein at least part of said high frequency connector is housed internally in said outlet.

17. The outlet as in claim 14, furthermore comprising a high frequency terminal unit housed internally in said outlet.

18. The outlet as in claim 14, wherein said connector is a standard data terminal equipment connector.

19. The outlet as in claim 14, wherein at least one of said high pass filters is housed internally in said outlet.

20. A splitter for coupling devices to a telephone line for telephony and high frequency communications, the telephone line having at least two electrically conductive segments each containing two distinct electrical conductors operative for conducting a low-frequency telephony band and a high-frequency band, the splitter comprising:

first and second low pass filters for conducting signals in the low-frequency telephony band, each of said low pass filters having first and second ports, said first port of each of said low pass filters being coupled to said two distinct conductors of a respective one of said electrically conductive segments and said second port of said first low pass filter being conductively coupled to said second port of said second low pass filter; and first and second high pass filters for conducting signals in the high-frequency band, each of said high pass filters having first and second ports, said first port of each of said high pass filters being coupled to said first port of a respective one of said low pass filters, said second port of each of said high pass filters being coupled to a respective high frequency connector, and said second ports of said high pass filters being electrically separated from one another.

21. The splitter as in claim 20 furthermore comprising a connector for selectively coupling a telephone device to said second ports of said low pass filters.

22. A system for conducting signals in a high frequency band over a telephone line wiring composed of two wires within the walls of a building, said wiring carrying telephony signals in a low frequency band and having a first point connected to external telephone wiring and one or more end points within the building, said system conducting signals in the high frequency band only between two distinct connection points forming a limited part of said telephone wiring simultaneously with the telephony signals, said system comprising two coupling units, each coupling unit having first, second and third input/output interfaces, a first selective signal conducting member connected for conducting only signals in the high frequency band between said first and second input/output interfaces and a second selective signal conducting member connected for conducting only telephony signals between said first and third input/output interfaces, wherein:

the first and second interfaces of the two coupling units are connected in series with the telephone wiring at said connection points to form a high frequency band path between the two second interfaces of the coupling units: and at least one of said third input/output interfaces is couplable to a telephone device.

23. A system for conducting signals in a high frequency band over a telephone line wiring composed of two wires within the walls of a building, said wiring carrying telephony signals in a low frequency band and having a first point connected to external telephone wiring and two outlets within the building, said system conducting signals in the high frequency band between said two outlets simultaneously with the telephony signals, said system comprising two coupling units, each having first, second and third input/output interfaces, a first selective signal conducting member connected for conducting only signals in the high frequency band between said first and second input/output interfaces and a second selective signal conducting member connected for conducting only telephony signals between said first and third input/output interfaces, wherein:

said first, second and third interfaces of each of said coupling units are housed in a respective one of said outlets;

said first and second interfaces of the two coupling units are connected in series with the telephone wiring inside said outlets to form a high frequency band path between the two second interfaces of the coupling units; and said system further comprises a telephone connector in a respective outlet for coupling said third input/output interface in said respective outlet to a telephone device.

24. A system for conducting signals in a high frequency band over a telephone line wiring composed of two wires within the walls of a building, said wiring carrying telephony signals in a low frequency band and having a first point connected to external telephone wiring and one or more end points within the building, said system conducting signals in the high frequency band between two connection points simultaneously with the telephony signals, said system comprising two coupling units, each having first, second and third input/output interfaces, a first selective signal conducting member connected for conducting only signals in the high frequency band between said first and second input/output interfaces and a second selective signal conducting member connected for conducting only telephony signals between said first and third input/output interfaces, wherein:

the first and second interfaces of the two coupling units are connected in series with the telephone wiring at said connection points to form a high frequency band path between the second interfaces of the two coupling units; and said third input/output interfaces of the two coupling units are couplable to a telephone device.

25. An outlet for configuring a network for the transport of data over a telephone line having two conductors and for enabling transmission of telephony signals over the telephone line simultaneously with the transport of data, said outlet comprising:

at least one data interface connector operative for establishing a data connection with a data device;

at least one telephone connector operative for supporting standard telephony service by connection to a standard telephone device; and a coupling unit having first, second and third input/output interfaces, a first selective signal conducting member connected for conducting only data communication signals between said first and second input/output interfaces and a second selective signal conducting member connected for conducting only telephony signals between said first and third input/output interfaces, said first input/output interface being connected in series with the two conductors of said telephone line, and said third input/output interface being coupled to said telephone connector, and wherein said outlet further comprise a modem coupled to said second interface and to said data interface connector operative to conduct data supplied over the telephone line.

26. An outlet for configuring a network for the transport of data over a telephone line, said outlet being connectable to two distinct wiring segments of the telephone line, each segment having two conductors, and for conducting telephone signals over the telephone line simultaneously with the transport of data, said outlet comprising:

at least one data interface connector operative for establishing a data connection with a data device;

at least one telephone connector operative for supporting standard telephony service by connection to a standard telephone device; and two coupling units each having first, second and third input/output interfaces, a first selective signal conducting member connected for conducting only data between said first and second input/output interfaces and a second selective signal conducting member connected for conducting only telephone signals between said first and third input/output interfaces, said first input/output interface being connected in series to the two conductors of one of said telephone line wiring segments, and at least one of said third input/output interfaces being coupled to said telephone connector, and wherein said outlet further comprise a repeater coupled to said both second interfaces operative to repeat signals in a high frequency band over the telephone line.

27. An outlet for configuring a network for the transport of data over a telephone line having two conductors and for conducting telephone signals over the telephone line simultaneously with the transport of data, the network outlet comprising:

at least one standard data interface connector operative for establishing a data connection with a data device;

at least one telephone connector operative for supporting standard telephony service by connection to a standard telephone device; and a coupling unit having first, second and third input/output interfaces, a first selective signal conducting member connected for conducting only data communication signals between said first and second input/output interfaces and a second selective signal conducting member connected for conducting only telephony signals between said first and third input/output interfaces, said first input/output interface being connected in series to the two conductors of one of said wiring segments of said telephone line, and said third input/output interface being coupled to said telephone connector, and wherein the outlet further comprise a standard data interface circuitry coupled to said second interface and to said standard data interface connector for communicating data between a data unit connected to said standard data connector and said second interface.

28. A system for providing power over a home phone line network, comprising: a home phone line network interface; a telephone interface; and a power supply; wherein each of said home phone line network interface, said telephone interface and said power supply are coupled to the home phone line network, wherein said home phone line interface transmits analog data signals over the home phone line network, wherein said telephone interface transmits analog voice signals over the home phone line network, and wherein said power supply generates an AC power signal over the home phone line network that does not interfere with said analog voice and data signals.

* * * * *